United States Patent
Baker

(10) Patent No.: US 9,494,256 B2
(45) Date of Patent: Nov. 15, 2016

(54) APPARATUS AND SYSTEM FOR RETRIEVING HOSE

(71) Applicant: Clinton D. Baker, Lorena, TX (US)

(72) Inventor: Clinton D. Baker, Lorena, TX (US)

(*) Notice: Subject to any disclaimer, the term of this patent is extended or adjusted under 35 U.S.C. 154(b) by 19 days.

(21) Appl. No.: 14/459,822

(22) Filed: Aug. 14, 2014

(65) Prior Publication Data

US 2015/0021373 A1    Jan. 22, 2015

Related U.S. Application Data

(63) Continuation-in-part of application No. 13/739,600, filed on Jan. 11, 2013.

(51) Int. Cl.
*F16L 1/06* (2006.01)
*B65H 54/58* (2006.01)

(52) U.S. Cl.
CPC .............. *F16L 1/065* (2013.01); *B65H 54/585* (2013.01); *B65H 2701/332* (2013.01); *Y10T 137/6899* (2015.04); *Y10T 137/6932* (2015.04)

(58) Field of Classification Search
CPC ...................... B65H 2404/10; B65H 2404/16; B65H 54/585; B65H 51/32; B65H 2701/33; B65H 2701/332; F16L 1/065; Y10T 137/6899; Y10T 137/6918; Y10T 137/6932
USPC ............ 137/355.12, 355.16, 355.2; 414/552, 414/509; 242/615.3; 226/176, 177, 186, 226/187
See application file for complete search history.

(56) References Cited

U.S. PATENT DOCUMENTS

| | | | |
|---|---|---|---|
| 3,601,038 A * | 8/1971 | Hayes | A62C 27/00 100/100 |
| 3,713,301 A | 1/1973 | Bryant | |
| 4,066,093 A * | 1/1978 | Egerstrom | B65H 75/425 137/355.12 |
| 4,588,142 A * | 5/1986 | Malzacher | B65H 54/2812 242/390.5 |
| 5,636,648 A * | 6/1997 | O'Brien | B08B 9/04 134/107 |
| 8,376,202 B2 * | 2/2013 | Baker | A62C 33/00 137/355.2 |
| 2005/0011979 A1 | 1/2005 | Best et al. | |

FOREIGN PATENT DOCUMENTS

| EP | 0631796 B1 | 10/1997 |
|---|---|---|
| JP | 8-229157 * | 9/1996 |
| JP | 08229157 | 9/1996 |

* cited by examiner

*Primary Examiner* — Michael R Reid
(74) *Attorney, Agent, or Firm* — David G. Henry, Sr.

(57) ABSTRACT

A system for recovering hose, including a hose receptacle having an open top portion for receiving a hose and attached hose couplings. The system further including a first device having a hose recovery means comprising an upper roller and a lower roller, at least one of the upper or lower rollers being powered, and a lifting arm operably coupled to the upper roller for moving the upper roller between a first position and a second position, the upper roller being closer to the lower roller when in the first position than when in the second position. Additionally, a platform having the first device arranged thereon and capable of moving above the receptacle along a first axis and a second axis to deposit the hose in the receptacle, and a platform moving means for moving the platform along the first axis and the second axis, wherein the first axis has first axis limits and the second axis has second axis limits, the first axis limits and second axis limits being substantially coextensive with dimensions of the open top portion of the hose receptacle.

20 Claims, 6 Drawing Sheets

APPARATUS AND SYSTEM FOR RETRIEVING HOSE

STATEMENT OF PRIORITY

This non-provisional patent application is a continuation-in-part and claims priority to U.S. patent application Ser. No. 13/739,600, entitled "Apparatus and System for Retrieving Hose" and filed Jan. 11, 2013, which claims priority to U.S. Pat. No. 8,376,202, entitled "Apparatus for Recovering Hose" filed Sep. 13, 2007 which claims priority to U.S. Provisional application No. 60/825,671 filed on Sep. 14, 2006.

TECHNICAL FIELD

The disclosures made herein relate generally to the firefighting industry, however should not be limited to such and may be used in other industries requiring hose retrieval, such as the oil and gas industry. The invention discussed herein is in the general classification of a hose retrieval apparatus and system that is designed to recover flexible hoses used for conveying liquids, such as fire hoses.

BACKGROUND

Fire hoses are traditionally comprised of multiple sections having hose couplings at opposite ends. The hose couplings are made of metal and cannot be compressed in the same manner as the hose. It is well known in the firefighting field that long portions of flexible fire hose are difficult to recover after being utilized in a firefighting situation. Long flexible fire hoses are notoriously difficult to retrieve after use due to the length, weight and large couplings used in connecting multiple sections of the hose. In typical day-to-day practice, several firefighters are necessary to recover and replace the fire hose, depending on the weight and length of the hose. A team of firefighters often must roll or fold up the flexible hose for storage on the fire engine. Such a burdensome practice may take many hours, and sometimes days, to complete.

A variety of automated or semi-automated hose retrieval devices and systems have been employed, but all of these suffer from inherent disadvantages. Some of these disadvantages include the inability to recover larger quantities of hose without expending substantial manpower time and effort and the inability to compactly recover hoses fitted with hose couplings, especially large diameter hose couplings. Some of the prior art devices also require a user to disassemble the recovery apparatus to remove the wound hose after it is collected. Other devices collect the hose in a confined area within the recovery apparatus, making it difficult to access. Other solutions utilize a complex and unreliable pulley and sensing system and/or a complex mechanical belting mechanism. Most of the prior art solutions also do not adequately address the dangers associated with couplings becoming stuck in the recovery apparatus and associated with operational belts being flung off the apparatus and/or debris being thrown off the hose by the apparatus. The prior art solutions also lack adjustability and the ability to customize to a given project and are frequently expensive to purchase and maintain.

Thus, there is a need for an easy to use, safe, adjustable, aesthetically pleasing, durable and relatively inexpensive hose retrieval device and system that allows hoses, including fire hoses and other larger diameter hoses having larger couplings, to be recovered with minimal human intervention.

SUMMARY OF THE INVENTION

The present disclosure introduces various illustrative embodiments for recovering hose and altering the deposit position of the recovered hose into a hose receptacle.

It is an object of the present disclosure to provide a system for recovering hose which includes a hose receptacle having an open top portion for receiving a hose having a hose coupling attached thereto. The system further includes a first device having a hose recovery means comprising an upper roller and a lower roller, wherein at least one of the upper or lower rollers is powered, thereby enabling retrieval of the hose. A lifting arm is operably coupled to the upper roller, thereby enabling the upper roller to move from a first into a second position, whereby a hose coupling is enabled to pass through the upper and lower rollers. The first device is arranged on a platform capable of moving above the receptacle along a first and second axis via a platform moving means, wherein the first and second axis have limits substantially coextensive with dimensions of the open top portion of the hose receptacle.

It is another object of the present disclosure to provide a method for recovering hose which includes positioning a hose having a hose coupling between an upper roller and lower roller of a first device, at least one of the upper or lower rollers being powered and thereby enabling retrieval of the hose. The method further retrieves the hose with the first device, altering the position of the upper roller from a first position to a second position with a lifting arm operably coupled to the upper roller, thereby enabling the hose coupling to pass between the upper and lower rollers. The method deposits the hose in a hose receptacle via an open top portion of the hose receptacle from a platform having the first device arranged thereon. The platform moves along a first axis and second axis via a platform moving means, the first a second axis having first axis limits and second axis limits substantially coextensive with dimensions of the open top portion of the hose receptacle, thereby enabling alteration of the position of hose deposit within the hose receptacle.

Other advantages, features, and embodiments are described below.

BRIEF DESCRIPTION OF THE DRAWINGS

The following figures are included to illustrate certain aspects of the present invention, and should not be viewed as an exclusive embodiments. The subject matter disclosed is capable of considerable modification, alteration, and equivalents in form and function, as will occur to one having ordinary skill in the art and the benefit of this disclosure.

DETAILED DESCRIPTION

Figure 1:
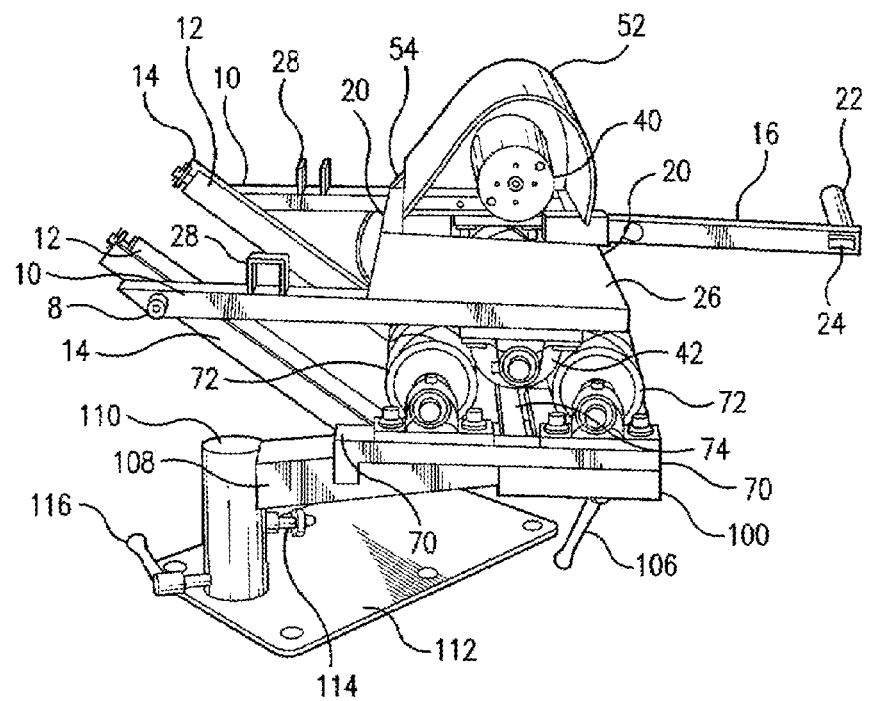
FIG. 1 is a perspective view of an embodiment of the present invention.

The present disclosure relates to systems and methods for recovering hose and altering the deposit position of the recovered hose into a hose receptacle.

An illustrative system includes a hose receptacle having an open top portion for receiving a hose having a hose coupling attached thereto. The system further includes a first device having a hose recovery means comprising an upper roller and a lower roller, wherein at least one of the upper or lower rollers is powered, thereby enabling retrieval of the hose. A lifting arm is operably coupled to the upper roller, thereby enabling the upper roller to move from a first into a second position, whereby a hose coupling is enabled to pass through the upper and lower rollers. The first device is arranged on a platform capable of moving above the receptacle along a first and second axis via a platform moving means, wherein the first and second axis have limits substantially coextensive with dimensions of the open top portion of the hose receptacle.

In some embodiments, the system may further include a controller means for selectively controlling movement of the platform along the first axis between the first axis limits. In further embodiments, the controller means may further control movement of the platform along the second axis between the second axis limits. Such movement may be effectuated by the system including teeth coupled to the house receptacle and corresponding gears coupled to the platform which interact with the teeth. In other embodiments, the platform moving means may comprise hydraulically, pneumatically, electrically, or mechanically moving the platform along the first and/or second axis.

In some embodiments, the system may include a second device being similar to the first device, where the second device includes a second upper and second lower roller, at least one of which being powered, and a second lifting arm coupled to the second upper roller, thereby enabling the second upper roller to be arranged in a second position and enable a hose coupled to pass between the second upper and lower rollers. The second device may work in conjunction with the first device to retrieve the hose, advantageously increasing pulling power, decreasing stress on each device, and enabling continuous retrieval of the hose while the hose coupling passes through each of the first and second devices.

Referring now to the drawings, wherein like reference numbers are used herein to designate like elements throughout the various views and embodiments of a unit. The figures are not necessarily drawn to scale, and in some instances the drawings have been exaggerated and/or simplified in places for illustrative purposes only. One of the ordinary skill in the art will appreciate the many possible applications and variations based on the following examples of possible embodiments. As used herein, the "present disclosure" refers to any one of the embodiments described throughout this document and does not mean that all claimed embodiments must include the referenced aspects.

FIG. 1 is a perspective view of an embodiment of the present invention. An apparatus for recovering hose includes a lifting frame assembly comprising: a plurality of lifting frame arms 10 and a lifting arm 16. In one embodiment, the lifting frame arms 10 and the lifting arm 16 are constructed of fourteen gauge, one inch square tubing. The lifting arm 16 includes an affixed lifting handle 22 and an electric switch 24. The lifting handle 22 is preferably fitted with a grip suited to an operator's comfort. The electric switch is preferably a 15 amp momentary rocker switch. The plurality of lifting frame arms 10 are coupled to a plurality of guide roller mounts by a plurality of biasing means hinges 8, such as ½ inch stainless steel shoulder bolts, to allow for lowering of the lifting frame arms 10 into a first position and lifting the lifting frame arms 10 into a second position. A plurality of guide rollers 12, preferably 1½ inch, constructed of galvanized steel, are attached to the plurality of guide roller mounts 14. The lifting frame assembly further comprises a plurality of support arms 20, preferably of one inch square tubing, attached between and perpendicular to the plurality of lifting frame arms 10. The lifting arm 16 is removably attached to the center of one of the support arms 20, preferably in the positions shown in FIG. 1-2. A flat safety plate 26, preferably constructed of 16 gauge to 18 gauge sheet metal, covers the plurality of support arms 20 and one of the lifting frame arms 10 to protect a user of the apparatus for recovering hose from injury. A plurality of lifting arm storage brackets 28 affixed to the lifting frame arms 10 allow for storage of the lifting arm 16 when the lifting arm 16 is removed from the apparatus. The lifting arm 16 may be removed from the apparatus and stored during periods of time when the apparatus is dormant.

A motor 40, preferably a 12 volt gear reduced electric motor, is mounted atop the lifting frame assembly. Other means of powering the apparatus, such as a 5 horsepower gas-powered motor with a 6:1 gear reducer, may also be used. Those skilled in the art will understand that a power supply (not shown) supplies power to the motor 40, which is thereafter mechanically coupled to a drive system as shown in FIG. 2.

Figure 2:
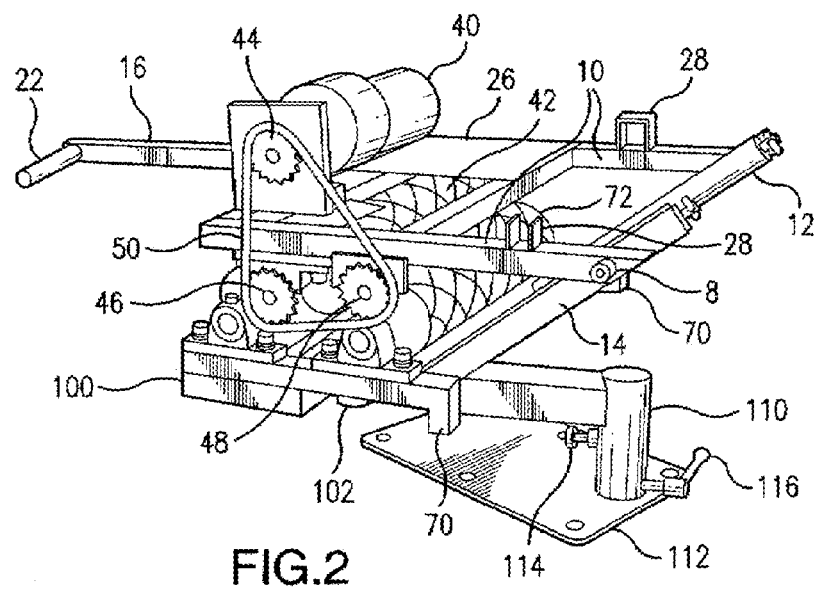
FIG. 2 is a rotated perspective view of an embodiment of the present invention.

FIG. 2 is a rotated perspective view of an embodiment of the present invention. The drive system comprises a rotational drive roller 42, which is constructed with a 3½ inch diameter cylindrical form and preferably made of a pliable surface such as diamond groove vulcanized rubber lagging with a rubber durometer of 60. The rotational drive roller 42 is removably secured on each of its ends to the plurality of lifting frame arms 10 on the opposite side of the motor 40. The rotational drive roller 42 may be secured to the lifting frame arms 10 by any available securing means, including bolting, welding, clamping or any similar securing means. The drive system further comprises a motor sprocket 44, preferably of 3½ inch diameter, a rotational drive roller sprocket 46, preferably of 3 inch diameter, and an idler sprocket 48, preferably of 3½ inch diameter, which are all co-rotational sprockets connected via a drive chain 50.

Those skilled in the art will understand that the electric switch 24 is normally connected via electrical wiring means to the motor 40 and that an operator's depression of the electric switch 24 supplies power to and activates the motor 40. Similarly, the operator's release of the electric switch 24 eliminates power to and deactivates the motor 40. When the operator of the apparatus for recovering hose depresses electric switch 24 and the motor 40 actuates, the motor 40 engages the motor sprocket 44, which in turn sets into motion the idler sprocket 48, which in turn sets into motion the rotational drive roller sprocket 46 for the reason that all are interconnected and continuously propelled by the drive chain 50. The rotational driver roller sprocket 46 is coupled to rotational driver roller 42. The actuation of the motor sprocket 44, and then in turn the actuation of the idler sprocket 48 and then in turn the actuation of the rotational driver roller sprocket 46 causes the rotational drive roller 42 to rotate counterclockwise on its own axis, as the reader views the apparatus as it is situated in FIG. 1. A motor cowling 52 and a drive cowling 54, both preferably constructed of 16 gauge sheet metal, are removably attached to the lifting frame arms 10 and cover the drive system and the motor 40. The motor cowling 52 and the drive cowling 54 protect the apparatus and the operator from damage or injury.

The plurality of guide roller mounts 14 are secured to a plurality of lower roller support arms 70, preferably constructed of one inch square tubing. A plurality of lower rollers 72, preferably 3½ inches in diameter, are secured at each of their ends to the plurality of lower roller support arms 70. The plurality of lower rollers 72 may be secured to the plurality of lower roller support arms 70 by any available securing means, including bolting, welding, clamping or any similar securing means. The plurality of lower rollers 72 are constructed preferably with a pliable surface such as diamond groove vulcanized rubber lagging with a rubber durometer of 60. The plurality of lower rollers 72 are freely rotatable about their respective axes. A plurality of lower roller support arm support members 74, constructed of one inch square tubing, are attached underneath and perpendicular to the lower roller support arms 70. As shown in FIGS. 1-2 and more fully shown in FIG. 3, the lower roller support members 74 are disposed into an adjustable, detachable support assembly.

Figure 3:
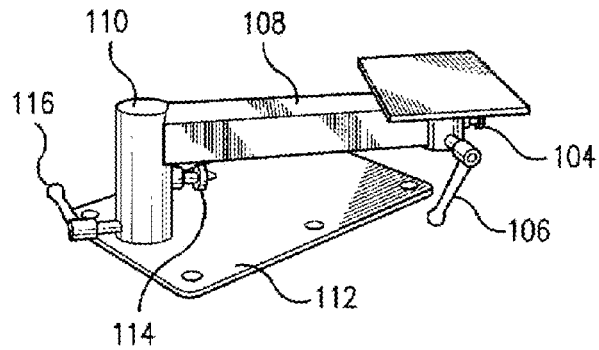
FIG. 3 is a perspective view of the support assembly of an embodiment of the present invention.

FIG. 3 is a perspective view of the support assembly of an embodiment of the present invention. The adjustable support assembly comprises a removably attached tray plate 100, a rotatable tray plate hub and spindle 102, a swing arm 108, a swing arm hub and spindle 110, and a base plate 112. The tray plate 100, constructed of steel, is preferably secured to the lower roller support arm support members 74 by a common lock pin (not shown). The tray plate 100 is secured to the rotatable tray plate hub and spindle 102. The tray plate 100 and the tray plate hub and spindle 102 are detachably affixed together by a spring loaded tray plate lock pin 104. A tray plate locking handle 106, in a tray plate locking handle closed position, prevents rotation of the tray plate 100 about the tray plate hub and spindle 102. In a tray plate locking handle's open position, rotation of the tray plate 100 about the tray plate hub and spindle 102 can occur. The swing arm 108, preferably constructed of 2 inch squaring tubing with a ¼ inch to ⅜ inch wall, is attached to and disposed between the tray plate hub and spindle 102 and the swing arm hub and spindle 110. A swing arm locking handle 116, in a swing arm locking handle's closed position, prevents rotation of the swing arm 108 about the swing arm hub and spindle 110. In a swing arm locking handle's open position, rotation of the swing arm 108 about the swing arm hub and spindle 110 can occur. The swing arm hub and spindle 110 is detachably affixed to the base plate 112 by a spring loaded tray plate lock pin 114. The base plate 112 can be mounted to a hose collecting and storage container, preferably a fire truck. The rotatability of both the swing arm 108 and the tray plate 100 provide the operator with the ability to adjust the apparatus for recovering hose into the operator's desired operating position.

Figure 4:
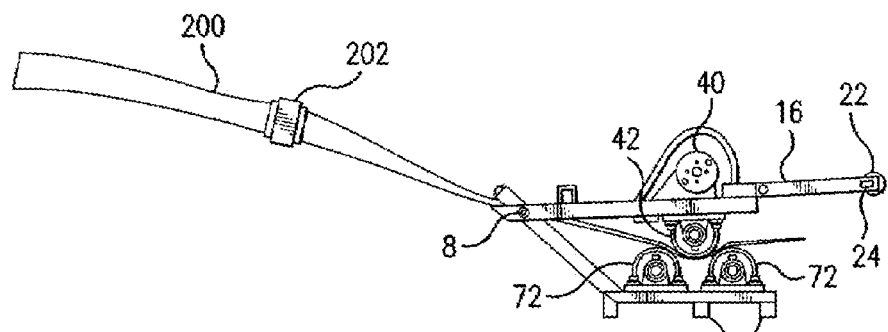
FIG. 4 is a side view of an embodiment of the present invention in action prior to encountering a hose coupling.
Figure 5:
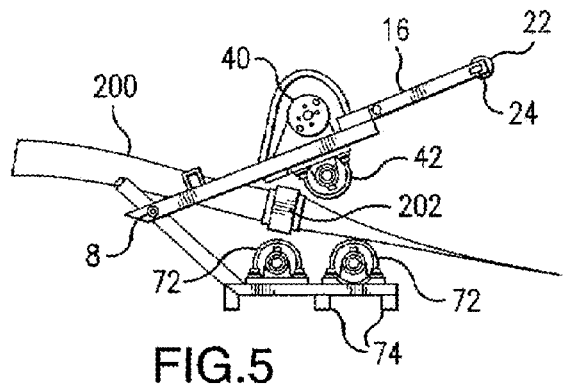
FIG. 5 is a side view of an embodiment of the present invention in action at the time a hose coupling is encountered.

Referring to FIGS. 4-5, where the principle of action of the transmission of this invention is shown, the apparatus for recovering hose as described in FIGS. 1-3 receives the hose 200 for recovery in a direction from left to right and is adaptable to pass a hose coupling 202 therethrough without any difficulty.

FIG. 4 is a side view of an embodiment of the present invention in action prior to encountering a hose coupling. FIG. 4 shows the apparatus for recovering hose in a first position, wherein hose 200 has entered the apparatus for recovering hose by having been disposed through the plurality of guide rollers 12, which are preferable rotatable and which guide the hose 200 in a position to move through the apparatus for recovering hose. FIG. 4 further shows the hose 200 disposed between the rotational drive roller 42 and the plurality of lower rollers 72, preferably two lower rollers of substantially similar size to the rotational drive roller 42.

During initiation of a hose recovery operation, the hose 200 should be positioned as shown in FIG. 4. An operator of the apparatus for recovering hose depresses the electric switch 24 to actuate the drive system as described above and shown in FIG. 2. Upon actuation of the drive system, in the first position, rotational drive roller 42 begins feeding the hose through the apparatus for hose recovery. The movement of the hose 200 caused by the initiation of drive roller 42 additionally causes the plurality of lower rollers 72 which are also in contact with the hose 200 to rotate about their axes. Once the hose 201 passes through the apparatus for recovering hose, the hose 200 can be collected, and preferably flaked and stored in the truck. The operator of the apparatus for recovering hose manually applies downward pressure to the lifting arm 16 so that the rotational drive roller 42, the hose 200, and the plurality of lower rollers 72 remain in contact throughout the hose recovery operation.

FIG. 5 is a side view of an embodiment of the present invention in action at the time a hose coupling is encountered. FIG. 5 illustrates the time in a hose recovery operation when the apparatus for recovering hose encounters a hose coupling 202. During the hose recovery operation, when a hose coupling 202 is encountered, the operator while continuation to depress the electric switch, will manually lift the lifting handle 22 to raise the lifting arm 16 vertically into a second position to provide space for the hose coupling 202 to dispose between the rotational drive roller 42 and the plurality of lower rollers 72. The rotational driver roller 42 continually contacts the hose coupling 202 until the hose coupling 202 passes through the apparatus for recovering hose. For purposes of illustration, FIG. 5 shows the hose coupling 202 as not contacting the rotational drive roller 42 or the plurality of lower rollers 72. It is preferable for the rotational driver roller 42, the hose coupling 202, and the plurality of lower rollers 72 to remain in contact as to continue feeding of the hose 200 through the apparatus for hose recovery. In addition, in FIGS. 4-5, for purposes of illustration, the detachable support assembly has been detached.

After the hose coupling 202 passes through the apparatus for recovering hose, the operator will apply manual downward pressure to the lifting handle 22 as to allow the lifting arm 16 to descend back into the first position as shown in FIG. 4.

At any time during the hose recovery operation, the operator may release the electric switch 24 to terminate the power supply to the motor 40. Said release deactivates the drive system to the apparatus for recovering hose and will terminate the hose recovery operation.

Figure 6:
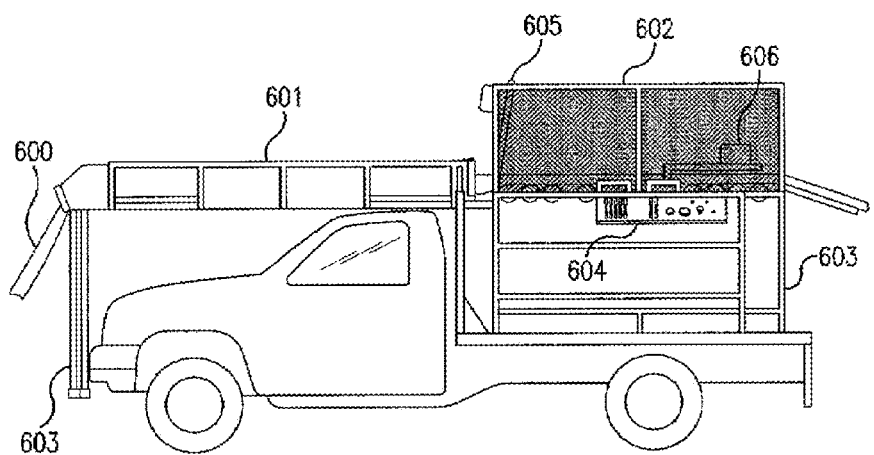
FIG. 6 is a side view of an embodiment of the system of the present invention.

FIG. 6 is a side view of an embodiment of the system of the present invention. A first device 605 and a second device 606 are utilized to recover a larger diameter hose 600 having couplings (e.g. twelve (12) inch diameter). The devices 605, 606 are mounted on top of the bed of a truck. The preferred embodiments of the devices 605, 606 are shown in further detail in FIG. 8.

The devices 605, 606 are lined up in series and spaced a few feet apart (with both devices situated in the same direction). This arrangement permits at least one of the devices to be closed at all times and increases the pulling power to handle heavier hoses and couplings. The devices can be mounted to a tractor, trailer, truck or other similar equipment. A cage 602 surrounds the devices 605, 606 on top of the truck to provide protection from debris or other projectiles that may be strewn about during the hose recovery process. A passageway between two walls 601 on top of the vehicle leading to the first device 605 is utilized in the recovery effort to help guide the hose 600 into the first device 605 to prevent bending and tangling of the hose 600. A variety of metal bars 603 are utilized to provide support for mounting the walls 601, cage 602 and devices 605, 606. Because the preferred embodiment of the system utilizes a hydraulic lifting system to open and close the devices 605, 606, a variety of hydraulic equipment and controls 604 are located beneath and operatively attached to the devices 605,606.

Figure 7:
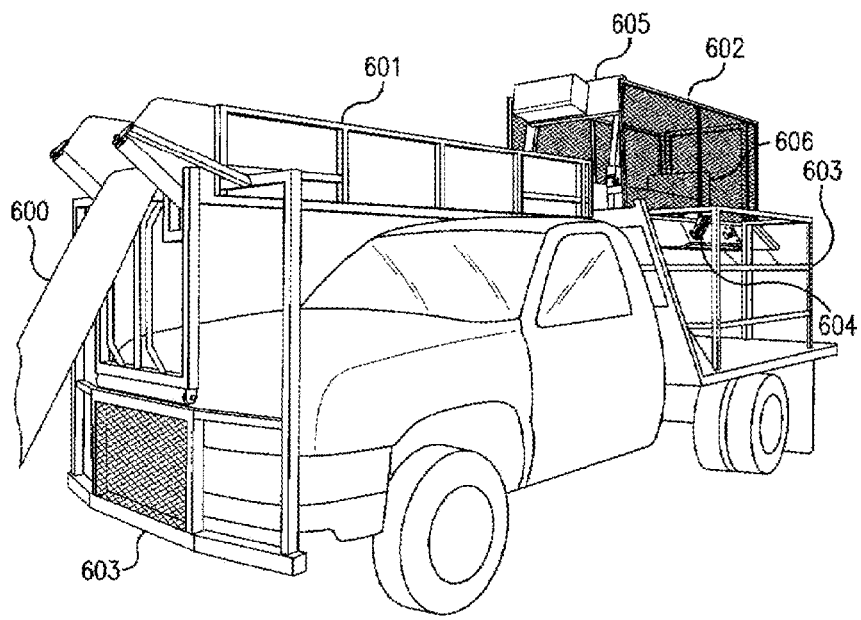
FIG. 7 is a perspective view of an embodiment of the system of the present invention.

FIG. 7 is a perspective view of an embodiment of the system of the present invention. The first device 605 and the second device 606 are utilized to recover a larger diameter hose 600 and couplings (e.g. twelve (12) inch diameter) and are mounted on top of the bed of a truck. The first device 605 is in the open position that is appropriate for permitting a hose coupling to pass through the device while the second device 606 is in a closed position to continue pulling the hose 600 through both devices 605, 606. The cage 602 surrounds the devices 605, 606 on top of the truck to provide some protection from debris or other projectiles that may be strewn about during the hose recovery process. The passageway between two walls 601 on top of the vehicle leading to the first device 605 is shown in better detail with the hose 600 disposed between the two walls 601 being pulled along the bottom of the passageway connecting the walls 601. A variety of metal bars 603 are utilized to provide support for mounting the walls 601, cage 602 and devices 605, 606. As previously mentioned, because the preferred embodiment of the system utilizes a hydraulic lifting system to open and close the devices 605, 606, a variety of hydraulic equipment and controls 604 are located beneath and attached to the devices 605, 606.

As one skilled in the art would recognize, a single device could also be mounted to a vehicle in a similar manner as described herein or, alternatively, more than two devices could be mounted to a vehicle in a similar manner as described herein.

Figure 8:
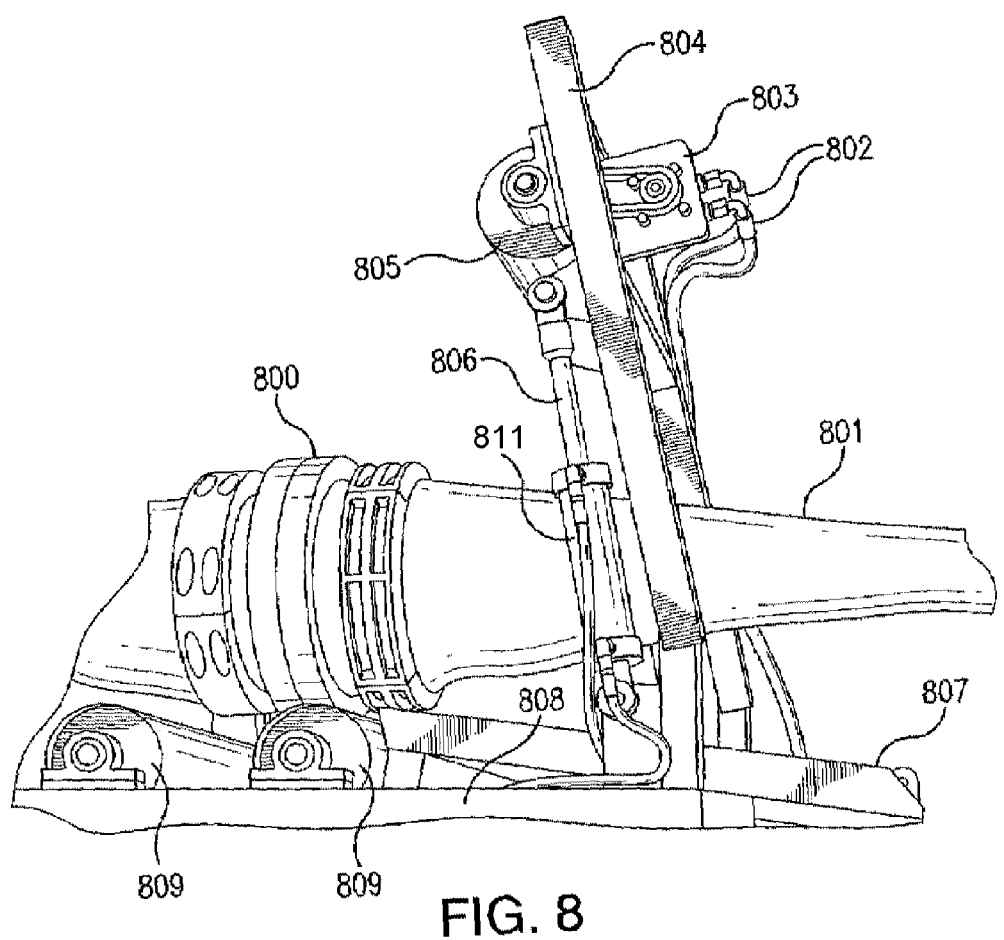
FIG. 8 is a side view of an alternative embodiment of the apparatus of the present invention.

FIG. 8 is a side view of an alternative embodiment of the apparatus of the present invention. The apparatus/devices shown in FIGS. 1-2 and FIGS. 4-5 could obviously be opened and closed through the use of a hydraulic lifting system. In such an arrangement, the lifting arm obviously would not be a necessary component of the device.

In the alternative embodiment shown in FIG. 8, the device has a plurality of lifting frame arms 804 having a motor disposed between the lifting frame arms 804 located beneath a cover 803. The motor is operatively connected to the rotational drive roller 805 also connected between the lifting frame arms 804. A biasing means such as a hinge connected to a pair of mounts 811 or other attaching arrangement similar to a hinge allows for lowering the lifting frame arms 804 into a first position and lifting the lifting frame arms 804 into a second position. A hydraulic lift cylinder 806 is utilized to raise and lower the lifting frame arms 804 when a hose coupling 800 on the hose 801 is encountered during the hose recovery process. The lower rollers 809 are stationary in this preferred embodiment (meaning they are not moved up and down from their position) and are shown with the coupling 800 resting on and between them. A platform 807 allows the coupling 800 to slide down it for easier storage after it passes the lower rollers 809. Framing 808 on the bottom of the device allows the device to be mounted to a truck or other vehicle. The lower rollers 809 are attached to the framing 808 connected to the pair of mounts 811 and the lower rollers 809 are located beneath the rotational drive roller 805 when the rotational drive roller 805 is in the first position. The hoses 802 permit oil or other fluid to travel through the system and activate the hydraulic lift cylinder 806.

Two of these devices can be installed in series as shown in FIGS. 6-7. As a result of this arrangement, a single operator can control the motor on the devices by depressing and releasing an electric switch located either directly on the devices or through a remote arrangement to cause the rotational drive roller on each device to begin collecting hose. The hydraulic lift system can be employed to allow, in a first position, the hose to be disposed between the rotational drive roller and the lower rollers. When a coupling is encountered, the operator can utilize the hydraulic lift system to raise the lifting frame arms into a second position to permit the coupling to pass. Obviously, the operator can perform the same operation when the coupling arrives at either device to permit the coupling to safely pass through both devices.

During the hose recovery operation, the rotational drive roller and the lower rollers of each device ideally remain in contact with the hose and/or the hose coupling, depending on which is passing through the device at a particular point in time.

Figure 9:
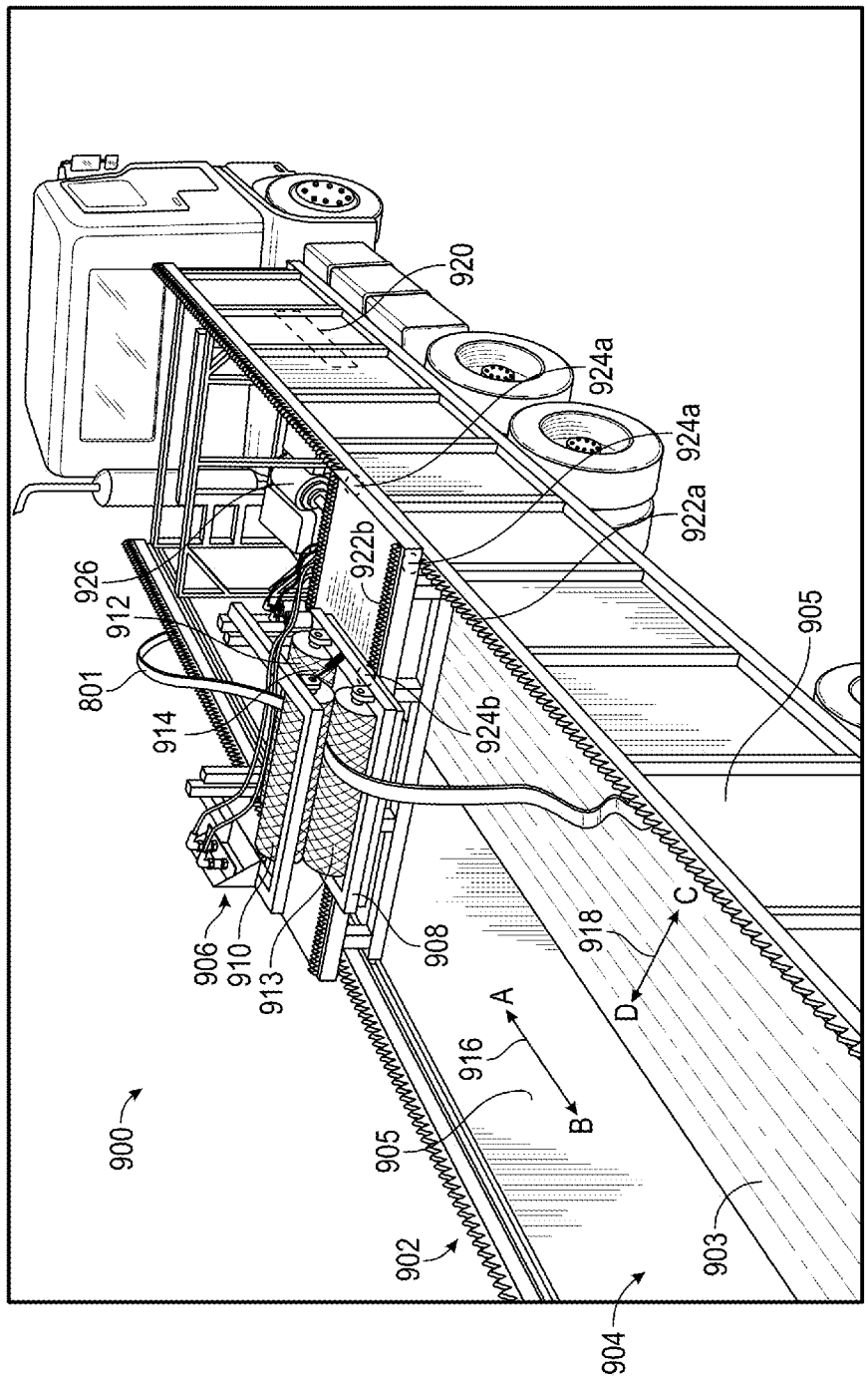
FIG. 9 is an upper-angled view of a system for altering the position of hose deposit during recovery.

FIG. 9 depicts an upper-angled view of a system 900 for altering the position of hose deposit during recovery, according to one or more embodiments. FIG. 9 depicts a hose receptacle 902 having an open top portion 904 for receiving a hose 801 and attached hose coupling (e.g., hose coupling 800 of FIG. 8). In some embodiments, and as depicted, the hose receptacle 902 includes a base 903 and walls 905. The walls 905 may be comprised, for example and without limitation, of mesh, plastic, metal, or any other material that may help contain the retrieved hose 801 within the hose receptacle 902.

A first device 906 is arranged on a platform 908 which may be moved by a platform moving means along dimensions substantially coextensive with those of the open top portion 904 of the hose receptacle 902. In some embodiments, such as described in FIGS. 1-5 and depicted in FIG. 9, the hose recovery means may include an upper roller 910 (similar to the previously discussed rotational drive motor 42) and a lower roller 912 (similar to the previously discussed lower roller 72). In order to retrieve the hose 801, at least one of the upper roller 910 or the lower roller 912 is powered, for example by a motor (e.g., motor 40 of FIG. 4) operatively coupled thereto. In other embodiments, the first device 906 may further include a second lower roller 913, wherein the second lower roller 913 is arranged to receive the hose after the first lower roller 912, thereby assisting transition of the hose through the first device 906 and into the hose receptacle 902.

The system 900 further includes a lifting arm 914 operably coupled to the upper roller 910 for moving the upper roller 910 between a first position and a second position, the upper roller 910 being closer to the lower roller 912 when in the first position than when in the second position. In some embodiments, the lifting arm 914 may be manually operated, similar to operation as described in FIGS. 1-5. In other embodiments, the lifting arm may be hydraulically operated, such as described in FIG. 8. In further embodiments, the system 900 may include a second lifting arm (not shown) coupled to the opposite side of the upper roller 910 than the lifting arm 914, and acting substantially simultaneously to the lifting arm 914 for moving the upper roller 910 between the first and second positions.

The platform moving means is capable of moving the platform 908, and thus the first device 906 and the deposit position of the hose, along a first axis 916 and a second axis 918. For example purposes only, as depicted in FIG. 9, the first axis 916 represents movement along the length of the hose receptacle 902, wherein direction A represents moving the platform 908 in a direction towards the front of the hose receptacle 902 (towards the vehicle), and direction B represents movement in a direction opposite of direction A. For further example purposes, the second axis 918 represents movement along the width of the hose receptacle 902, wherein direction C represents movement towards a first side of the hose receptacle 902 and direction D represents movement in the opposite direction. In some embodiments, the first axis has first axis limits, and the second axis has second axis limits, the first axis limits and second axis limits being substantially coextensive with dimensions of the open top portion 904 of the hose receptacle 902.

In some embodiments, the system 900 may further include a controller means 920 for selectively controlling movement of the platform 908. For example, in one embodiment, the controller means may be the controls 604 (FIG. 6) coupled to a hydraulic or pneumatic pump 926 which is coupled to hydraulic or pneumatic actuators (not shown) between the platform 908 and the frame of the hose receptacle 902. In other embodiments, mechanical means may be utilized, such as teeth and gears as discussed in more detail below, and/or an electrical means of a first and second motor (not shown) coupled thereto for moving the platform 908 along the first axis 916 and the second axis 918. In some embodiments, the controller means 920 may include selectively controlling movement of the platform 908 along the first axis 916 between the first axis limits.

In some embodiments, the controller means 920 may further include selectively controlling movement of the platform 908 along the second axis 918 between the second axis limits. In further embodiments, the controller means may include a processor (e.g., coupled to the controller means 920) capable of monitoring the location of the platform 908 in relation to the first and second axis limits, and thus automatically moving the platform 908 upon the platform 908 substantially reaching a limit of either the first or second axis limits, thereby preventing damage to the first device 906 and continuing efficiency of hose placement within the hose container 902.

In some embodiments, the platform moving means may comprise teeth 922a (or a row or track of teeth 922a) coupled to the hose receptacle 902 and corresponding gears 924a (or wheels with teeth that may interact with the teeth 922a) operatively coupled to the platform 908, wherein the teeth 922a and gears 924a interact to move the platform along the first axis 916. Example gear and teeth technologies may be cog gears and cog racks or spur gears. Such technology may also be implemented to move the platform 908 along the second axis 918, as depicted by the teeth 922b and corresponding wheels or gears 924b.

In some embodiments, the system 900 may further include a first motor (e.g. coupled to the gears 924a) capable of moving the platform 908 along the first axis 916, and a second motor (e.g. coupled to the gears 924b) capable of moving the platform 908 along the second axis 918.

In further embodiments, a second device (not shown) may also be arranged on the platform 908. The second device may be substantially similar to the first device 906, wherein the second device also has upper and lower rollers, at least one of which being powered by a motor, and further including a corresponding lifting arm. Similar to the first device 605 and device 606 of FIG. 6, the second device of FIG. 9 may be arranged such that it receives the hose after the first device 906, wherein the second device then deposits the hose into the hose receptacle 904.

Advantageously, such a configuration enables the hose 801 to continue being retrieved while one of the first device 906 or second device operates to enable a hose coupling to pass through. For example, the hose coupling first reaches the first device 906 which raises the upper roller 910 to the second position, thereby enabling the coupling to pass therethrough. The coupling passes through the first device via the hose 801 continuing to be pulled by the second device. Once the coupling has passed the first device, the first device may lower the upper roller 910 and regain traction with the hose 801 to continue retrieving the hose 801 and pushing it towards the second device. Upon the hose coupling reaching the second device, the lifting arm of the second device may raise the upper roller of the second device, thereby allowing the coupling to pass (e.g., be pushed by the first device 906) therethrough. Once the coupling has passed the second device, the upper roller of the second device may be lowered.

Figure 10:
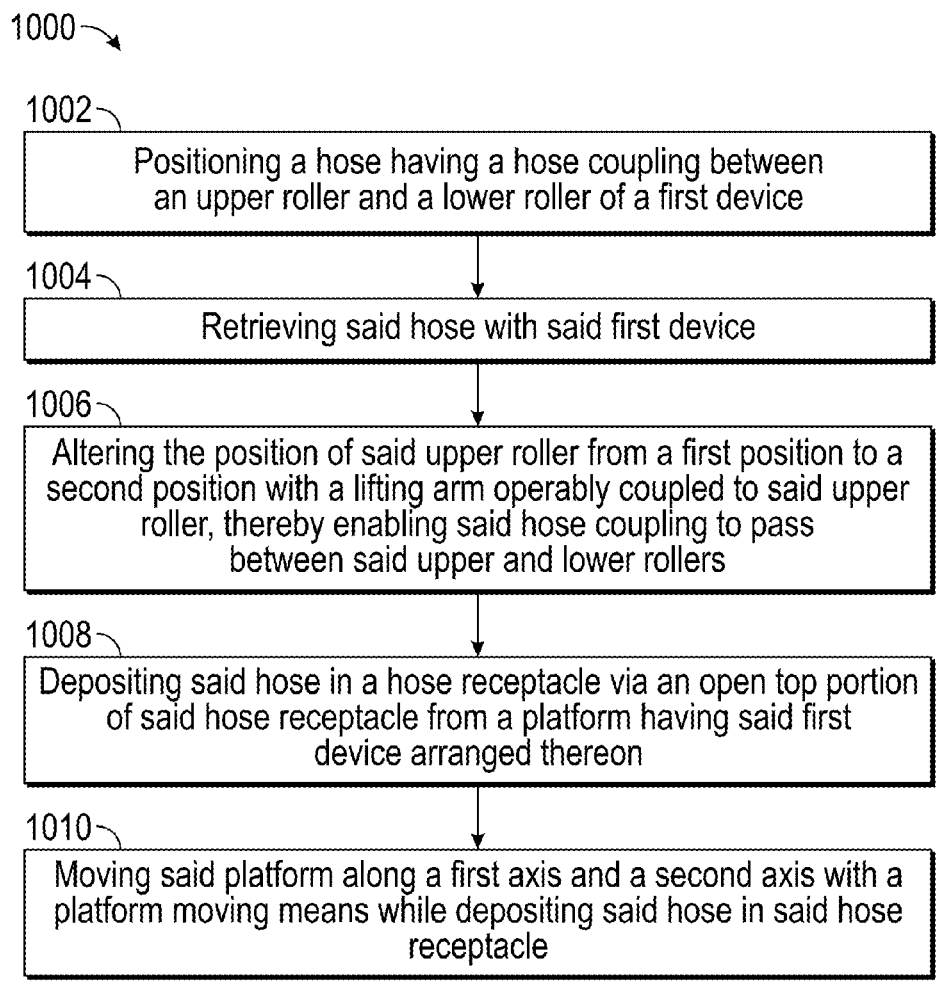
FIG. 10 is a flow diagram of a method for recovering a hose.

FIG. 10 depicts a flow diagram of a method 1000 for recovering hose. At block 1002, a hose having a hose coupling is positioned between an upper roller and a lower roller of a first device, wherein at least one of the upper or lower rollers is powered. In some embodiments, the upper or lower roller may be powered by a motor (e.g. an electric motor) operatively coupled thereto. For example, a motor coupled to the upper roller by a chain. Alternatively, a gear combination may be used for interaction between the motor and upper roller. Similar examples could be implemented for the lower roller as well.

At block 1004, the hose is retrieved with the first device via operation of the upper and/or lower powered rollers. Upon the hose coupling reaching the first device, the position of the upper roller may be altered from a first position to a second position with a lifting arm operably coupled to the upper roller, thereby enabling the hose coupling to pass between the upper and lower rollers, as at block 1006. At block 1008, the hose is deposited into a hose receptacle from the first device via an open top portion of the hose receptacle, a platform having the first device arranged thereon. At block 1010, the platform is moved along a first axis and a second axis with a platform moving means while depositing the hose into the hose receptacle. The first and second axis may have first and second axis limits, accordingly, substantially coextensive with the dimensions of the open top portion of the hose receptacle.

In some embodiments, the method 1000 may further include controlling movement of the platform along the first axis between the first axis limits with a controller means. The controller means, for example, may be levers which control hydraulic, pneumatic, electrical, or mechanical means of moving the platform. For example, there may be teeth coupled to the container and corresponding gears or wheels coupled to the platform to interact with the teeth to move the platform. Such gears or wheels may be driven by an electrical means, such as electrical motors. In further embodiments, the method may further include controlling movement of the platform along the second axis between the second axis limits with the controller means. In other embodiments, the method may automatically move the platform upon the platform substantially reaching a limit of either the first axis limits or second axis limits.

In some embodiments, the platform may further include a second device which is substantially similar to the first device, thus comprising a second upper roller and a second lower roller, at least one of the second upper or lower rollers being powered (e.g., by a motor operatively coupled thereto). The second upper roller is operably coupled to a second lifting arm and arranged closer to the second lower roller when in a first position than when in a second position.

Advantageously, the second device may work in cooperation with the first device to retrieve the hose and deposit it in the hose receptacle. In exemplary operation, at least one of the first or second devices initially work to retrieve the hose. Upon a hose coupling reaching the first device, the upper roller of the first device may be arranged into the second position, thus allowing the coupling to pass therethrough. Retrieval of the hose and coupling may be continued by operation of the second device. Upon the coupling passing through the first device, the upper roller of the first device may be arranged back to the first position. At least one of the first and or second devices is operated until the coupling reaches the second device, wherein the position of the second upper roller of the second device is arranged in a second position. The coupling may pass through the second device via operation of at least the first device (e.g., pushing the hose and coupling through the second device). Once the coupling has passed through the second device, the second roller of the second device may be placed back in the first position.

A person of skill in the art would readily recognize that the order of the steps of the above-described method is not necessarily critical and could be altered without departing from the spirit of the invention. Moreover, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A system for recovering hose, comprising:
   a hose receptacle, said hose receptacle having an open top portion for receiving a hose with attached hose couplings;
   a first device having a hose recovery means for recovering said hose, said hose recovery means comprising an upper roller and a lower roller, at least one of said upper or lower rollers being powered;
   a lifting arm operably coupled to said upper roller for moving said upper roller between a first position and a second position, said upper roller being closer to said lower roller when in said first position than when in said second position;
   a platform having said first device arranged thereon and capable of moving above said receptacle along a first axis and a second axis to deposit said hose in said receptacle; and
   a platform moving means for moving said platform along said first axis and said second axis, wherein said first axis has first axis limits and said second axis has second axis limits, said first axis limits and second axis limits being substantially coextensive with dimensions of said open top portion of said hose receptacle.

2. The system of claim 1, wherein at least one of said upper or lower rollers is powered by a motor operatively coupled thereto.

3. The system of claim 1, further comprising controller means for selectively controlling movement of said platform along said first axis between said first axis limits.

4. The system of claim 3, wherein said controller means further comprise selectively controlling movement of said platform along said second axis between said second axis limits.

5. The system of claim 4, wherein said controller means automatically moves said platform upon said platform substantially reaching a limit of either of said first axis limits or said second axis limits.

6. The system of claim 1, wherein said platform moving means further comprises teeth coupled to said hose receptacle and corresponding gears coupled to said platform, and wherein said teeth and gears interact to move said platform along said first axis.

7. The system of claim 1, wherein said platform moving means further comprises at least one of hydraulically, pneumatically, or electrically moving said platform along at least one of said first or second axis.

8. The system of claim 1, wherein said platform moving means further comprises mechanically moving said platform along at least one of said first or second axis.

9. The system of claim 1, further comprising a second lifting arm coupled to said upper roller and acting substantially simultaneously to said first lifting arm for moving said upper roller between said first and second positions.

10. The system of claim 1, wherein said first device further comprises a second lower roller, said second lower roller arranged to receive said hose after said first lower roller.

11. The system of claim 1, wherein said platform moving means includes a first motor for moving said platform along said first axis and a second motor for moving said platform along said second axis.

12. The system of claim 1, further comprising a second device having a second upper and second lower roller, at least one of said second upper and lower rollers being powered by a second motor coupled thereto, said second upper roller being coupled to a corresponding second lifting arm, wherein said second device is also arranged on said platform and receives said hose after said first device.

13. A method for recovering hose, comprising:
   positioning a hose having a hose coupling between an upper roller and a lower roller of a first device, at least one of said upper or lower rollers being powered;
   retrieving said hose with said first device;
   altering the position of said upper roller from a first position to a second position with a lifting arm operably coupled to said upper roller, said upper roller being closer to said lower roller when in said first position than when in said second position, thereby enabling said hose coupling to pass between said upper and lower rollers;

depositing said hose in a hose receptacle via an open top portion of said hose receptacle from a platform having said first device arranged thereon;

moving said platform along a first axis and a second axis with a platform moving means while depositing said hose in said hose receptacle, wherein said first axis has first axis limits and said second axis has second axis limits, said first axis limits and second axis limits being substantially coextensive with dimensions of said open top portion of said hose receptacle.

14. The method of claim 13, wherein powering said at least one of said upper or lower rollers is performed via a motor operatively coupled thereto.

15. The method of claim 13, further comprising controlling movement of said platform along said first axis between said first axis limits with a controller means.

16. The method of claim 15, further comprising controlling movement of said platform along said second axis between said second axis limits with said controller means.

17. The method of claim 16, further comprising automatically moving said platform upon said platform substantially reaching a limit of either of said first axis limits or said second axis limits.

18. The method of claim 13, further comprising at least one of hydraulically, pneumatically, or electrically moving said platform along at least one of said first or second axis with said platform moving means.

19. The method of claim 13, further comprising mechanically moving said platform along at least one of said first or second axis with said platform moving means.

20. The method of claim 13, wherein said platform further includes a second device comprising a second upper roller and a second lower roller, at least one of said second upper or lower rollers being powered, said second upper roller being operably coupled to a second lifting arm and closer to said second lower roller when in a first position than when in a second position, said method further comprising:

altering the position of said upper roller of said first device back to said first position;

moving said hose coupling from said first device towards said second device;

altering the position of said second upper roller of said second device to said second position;

moving said hose coupling through the second device via operation of at least said first device.

* * * * *